United States Patent [19]

Mottram

[11] 3,967,639
[45] July 6, 1976

[54] TIRE VALVE CORE

[75] Inventor: Charles P. Mottram, Stratford, Conn.

[73] Assignee: National Distillers and Chemical Corporation, New York, N.Y.

[22] Filed: Jan. 2, 1975

[21] Appl. No.: 538,056

[52] U.S. Cl............................ 137/234.5; 152/415; 285/247
[51] Int. Cl.² ........................................ F16K 15/20
[58] Field of Search .......... 137/223, 227, 229, 231, 137/234.5; 152/415; 285/338, 251, 247

[56] References Cited
UNITED STATES PATENTS

| | | | |
|---|---|---|---|
| 2,216,839 | 10/1940 | Hoffman | 285/338 X |
| 2,441,718 | 5/1948 | Parker | 285/247 X |
| 2,697,620 | 12/1954 | Margrave | 285/247 X |
| 3,712,328 | 1/1973 | McAnally | 137/234.5 |

FOREIGN PATENTS OR APPLICATIONS

| | | | |
|---|---|---|---|
| 911,981 | 12/1962 | United Kingdom | 137/223 |
| 725,236 | 3/1955 | United Kingdom | 137/234.5 |

Primary Examiner—Harold W. Weakley

[57] ABSTRACT

A tire valve core including a metallic shell having a seat thereon for a plastic gasket, the seat extending between a peripheral bead including a perpendicular wall portion on the inner face thereof and an annular rib having an inwardly tapered peripheral surface and a perpendicular shoulder on the inner face thereof; the seat being provided with a plurality of annular grooves spaced inwardly from said rib and extending over approximately 50% of the seat width and with the remainder of the seat providing an inwardly tapered smooth surface.

3 Claims, 4 Drawing Figures

TIRE VALVE CORE

This invention relates to tire valve cores and more particularly to such cores which include a barrel which is surrounded, intermediate the extremities thereof, by resilient sealing means in the form of a plastic gasket.

Desirably barrels of the character with which we here are concerned are constituted by drawn metal shells which may be produced with economy. A particularly suitable material from which the sealing gasket may be produced is polytetrafluoroethylene which will not stick or adhere to the valve seat under operative conditions but will separate therefrom readily when the core is removed.

To retain the gasket upon the barrel against inadvertent displacement, or movement axially thereof, the barrel may be provided with a pair of spaced peripheral bands or beads and it has been proposed in the prior art to provide a peripheral groove immediately adjacent the inner face of each peripheral bead, the arrangement being such that the marginal edges of the gasket are forced into these grooves. However, for reasons which will be pointed out more fully hereafter, such structures have been far from satisfactory, or efficient, since the central portion of the gasket, intermediate the marginal edges thereof is free to move axially under pressure, resulting in undesirable distortion of the gasket lengthwise in a direction away from one bead and toward the other.

Accordingly, it is a major purpose of the present invention to provide means in a novel valve core, having a drawn metal barrel and a plastic gasket mounted thereupon in surrounding relationship, for insuring retention of the gasket throughout the entire length thereof and particularly the central portion, against endwise or axial movement under operative conditions.

Further objects and advantages of the invention will be readily apparent from the following description taken in conjunction with the accompanying drawing wherein.

Figure 1:
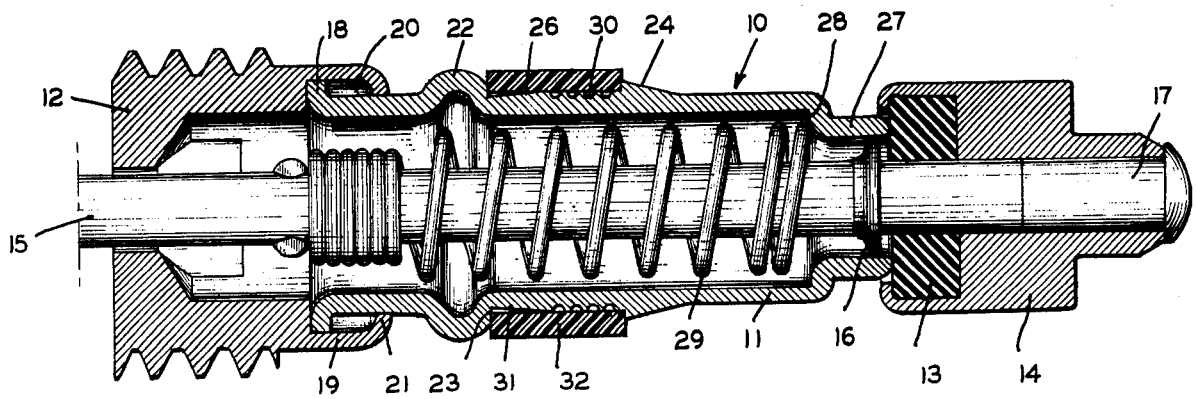
FIG. 1 is a longitudinal sectional view of a valve core constructed in accordance with the present invention.
Figure 2:
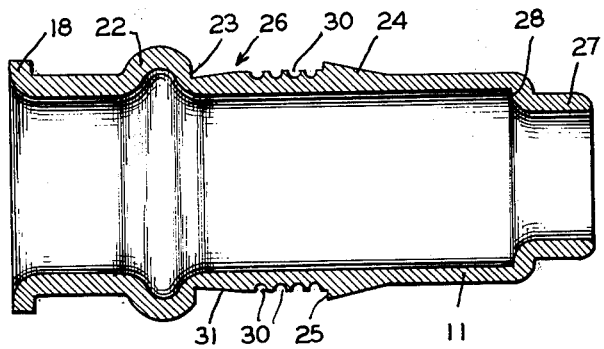
FIG. 2 is an elevational view of the drawn metal barrel per se illustrating a sealing gasket, shown in section, positioned thereupon.

As shown in the drawings, the novel valve core indicated generally at 10 comprises a barrel 11 and an externally threaded screw plug 12. Desirably, the screw plug is machined and the barrel is a drawn sheet-metal shell.

The lower extremity of the barrel 11 engages a resilient washer 13 retained within the cup 14 as is conventional in this art. The valve center pin 15 extends through the barrel and screw plug and is maintained in axial alignment by reason of the enlarged annular shoulder 16, the cup 14 being mounted upon the extremity 17 of the valve pin.

The outer extremity of the barrel 11 terminates in an outwardly directed enlarged flange 18 and the screw plug 12 is provided at the lower extremity thereof with a relatively thin annular wall portion 19 providing an internal recess 20 having a diameter complementary to that of the enlarged flange 18 and within which this portion of the barrel 11 is received. To provide for secure assembly between the screw plug 12 and the barrel 11, the annular wall portion 19 is rolled or peened inwardly as indicated at 21.

The barrel 11 is provided with a rolled peripheral bead 22 terminating on one side thereof in a substantially perpendicular wall portion 23 creating a sharply defined shoulder at the point of juncture with the outer surface of the barrel. Spaced from the shoulder 23, the barrel is provided with a slightly enlarged annular rib 24 having an inwardly tapered outer surface and providing a sharply defined shoulder 25 at the point of juncture with the barrel. The opposed shoulders 23 and 25 provide a seat 26 located substantially centrally of the length of the barrel 11 and upon which the sealing gasket is retained.

The lower extremity 27 of the barrel is of reduced diameter providing an internal shoulder 28 upon which the valve spring 29, which surrounds the valve pin 15, seats in conventional manner.

Figure 3:
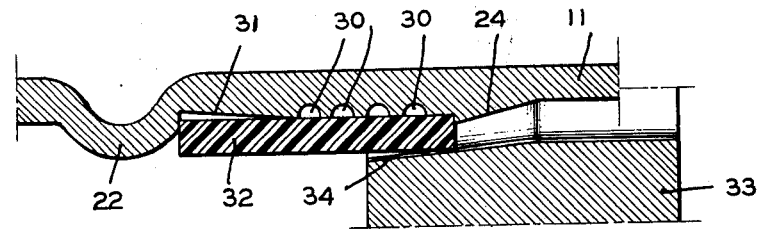
FIG. 3 is a fragmentary sectional view on an enlarged scale illustrating the assembled relationship between valve core and gasket and the valve stem.
Figure 4:
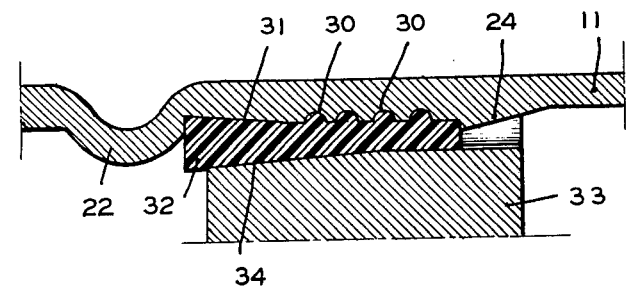
FIG. 4 is a fragmentary sectional view similar to FIG. 3 and illustrating this assembly under operative conditions.

As shown more particularly in FIGS. 3 and 4 of the drawing, the gasket seat 26 is provided with a plurality of parallel annular grooves 30 spaced inwardly from the annular shoulder 24 and extending over approximately 50% of the width of the seat. Desirably, these grooves are arcuate, having a radius on the order of 0.005 inch, and are produced upon the barrel by a rolling operation. The remainder of the gasket seat tapers inwardly as indicated at 31 from adjacent the groove farthest removed from the shoulder 25 to the bottom of the opposed perpendicular wall portion or shoulder 23.

The sealing gasket 32 is constituted by a relatively short length of extruded polytetrafluorethylene of an interior diameter complementary to the diameter of the seat 26, has a snug fit therewith, and is of a length substantially identical to the extent of the gasket seat and fits snugly between the opposed perpendicular wall portions or shoulders 23 and 25. In assembled relationship, when the valve core 10 is threaded into the stem 33, there will be deformation of the gasket by reason of compression against the tapered wall surface 34 of the valve stem and the gasket will be forced progressively into the annular grooves 30 formed in the gasket seat 26. This is illustrated clearly in FIGS. 3 and 4 of the drawing and will result in a progressive and secure anchoring of the gasket thereby obviating any possibility of endwise movement of disassociation with the gasket seat.

It will be noted that the grooves 30 extend over the initial portion (approximating 50%) of the gasket seat and the remainder thereof is constituted by the inwardly tapered surface 31. This structural arrangement provides an annular area limited by the perpendicular wall portion 23 into which the remote extremity of the gasket is forced as the core reaches the limit of its threaded engagement with the valve stem.

Anchoring the gasket in this manner, as distinguished from prior art attempts to accomplish a similar result by way of an annular groove immediately adjacent the opposed marginal portions of the gasket seat, insures a progressively increased sealing relationship between the gasket and both the core barrel and the valve stem as the core is threaded into operative assembled relationship.

There has thus been provided a novel valve core which may be produced with particular economy and wherein prior art deficiencies, particular reference being had to barrel and gasket association, have been obviated. It will be apparent to those skilled in this art that various structural changes may be made in the invention without departing from the spirit and scope thereof. Thus, the invention is not limited by that which is shown in the drawing and described in the specification and reference therefore is had to the claims for summaries of the essentials of the invention, novel features of construction, and novel combinations of parts, for all of which protection is desired.

What is claimed is:

1. In a tire valve core including a tubular barrel and an externally threaded machined head, the tubular barrel terminating at one extremity in an outwardly directed enlarged flange receivable within said machined head and said head being provided with a relatively thin annular wall portion terminating in an inwardly directed extremity to insure retention therein of the annular flange on said tubular barrel, a plastic gasket surrounding said barrel substantially centrally of the length thereof, and valve means extending through said tubular barrel and machined head; the improvement which includes a peripheral bead formed on said barrel, the inner face of said bead being constituted by a substantially perpendicular wall portion creating a sharply defined shoulder at the point of juncture with the outer surface of said barrel, said barrel further being provided with a slightly enlarged annular rib having an inwardly tapered outer surface and providing a sharply defined shoulder at the point of juncture with said barrel, said rib being spaced from said peripheral bead to provide a gasket seat therebetween the extent of said seat being determined by the opposed sharply defined shoulders on said peripheral bead and enlarged annular rib, said gasket seat being provided with a plurality of parallel annular grooves spaced inwardly from the shoulder on said annular rib and extending inwardly from the shoulder on said enlarged annular rib over approximately 50% of the width of said gasket seat, the material of said plastic gasket progressively entering into said spaced annular grooves when said valve core is positioned within a valve stem, said gasket seat also including an inwardly tapered portion beyond the grooved portion thereof said inwardly tapered portion extending from adjacent the groove farthest removed from the shoulder on the annular rib to the bottom of the perpendicular wall portion on the peripheral bead.

2. A tire valve core as set forth in claim 1 where said barrel is a drawn metal shell.

3. A tire valve core as set forth in claim 1 where said gasket is produced from polytetrafluorethylene.

* * * * *